(12) United States Patent
Schmidt

(10) Patent No.: US 8,937,279 B2
(45) Date of Patent: Jan. 20, 2015

(54) SUPER-RESOLUTION FORMATION FLUID IMAGING WITH CONTRAST FLUIDS

(71) Applicant: Saudi Arabian Oil Company, Dhahran (SA)

(72) Inventor: Howard K. Schmidt, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 14/454,927

(22) Filed: Aug. 8, 2014

(65) Prior Publication Data

US 2014/0347055 A1 Nov. 27, 2014

Related U.S. Application Data

(63) Continuation-in-part of application No. 14/187,968, filed on Feb. 24, 2014, now Pat. No. 8,803,077, which is a continuation of application No. 13/707,721, filed on Dec. 7, 2012, now Pat. No. 8,664,586.

(60) Provisional application No. 61/568,403, filed on Dec. 8, 2011.

(51) Int. Cl.
*G01V 3/00* (2006.01)
*G01V 3/08* (2006.01)

(52) U.S. Cl.
CPC .......... *G01V 3/083* (2013.01); *G01V 2003/084* (2013.01)
USPC ............................. 250/265; 324/323; 702/11

(58) Field of Classification Search
USPC ...................... 250/253, 256, 264, 265, 69.12; 324/323; 702/7, 11; 703/10
See application file for complete search history.

(56) References Cited

U.S. PATENT DOCUMENTS

| | | | |
|---|---|---|---|
| 5,373,443 A * | 12/1994 | Lee et al. | .......................... 702/7 |
| 7,477,162 B2 | 1/2009 | Clark | |
| 2006/0203613 A1 | 9/2006 | Thomsen et al. | |
| 2007/0209799 A1 | 9/2007 | Vinegar et al. | |
| 2007/0294036 A1 | 12/2007 | Strack et al. | |
| 2009/0133870 A1 | 5/2009 | Pavlov et al. | |
| 2009/0150077 A1 | 6/2009 | Stoller et al. | |
| 2009/0179649 A1 * | 7/2009 | Schmidt et al. | ............... 324/345 |

(Continued)

FOREIGN PATENT DOCUMENTS

CN 102147484 A 8/2011

OTHER PUBLICATIONS

International Search Report and Written Opinion, PCT/US2012/068367, mailed Aug. 20, 2013.

*Primary Examiner* — Mark R Gaworecki
(74) *Attorney, Agent, or Firm* — Bracewell & Giuliani LLP; Constance G. Rhebergen; Albert B. Kimball, Jr.

(57) ABSTRACT

Cross-well electromagnetic (EM) imaging is performed using high-power pulsed magnetic field sources, time-domain signal acquisition, low-noise magnetic field sensors, spatial oversampling and super-resolution image enhancement and injected contrast fluids. The contrast fluids increase the electromagnetic character of the formation and fluids, either the magnetic permeability or the dielectric permittivity. The acquired signals are processed and inter-well images are generated mapping electromagnetic (EM) signal speed (group velocity) rather than conductivity maps. EM velocity maps with improved resolution for both native and injected fluids are provided.

17 Claims, 14 Drawing Sheets

(56) References Cited

U.S. PATENT DOCUMENTS

| | | |
|---|---|---|
| 2009/0204330 A1 | 8/2009 | Thomsen et al. |
| 2009/0205899 A1 | 8/2009 | Geerits et al. |
| 2011/0108283 A1 | 5/2011 | Srnka et al. |
| 2011/0227577 A1 | 9/2011 | Zhang et al. |
| 2011/0255371 A1 | 10/2011 | Jing et al. |
| 2012/0120767 A1 | 5/2012 | Vu et al. |
| 2012/0201096 A1 | 8/2012 | Valero et al. |

\* cited by examiner

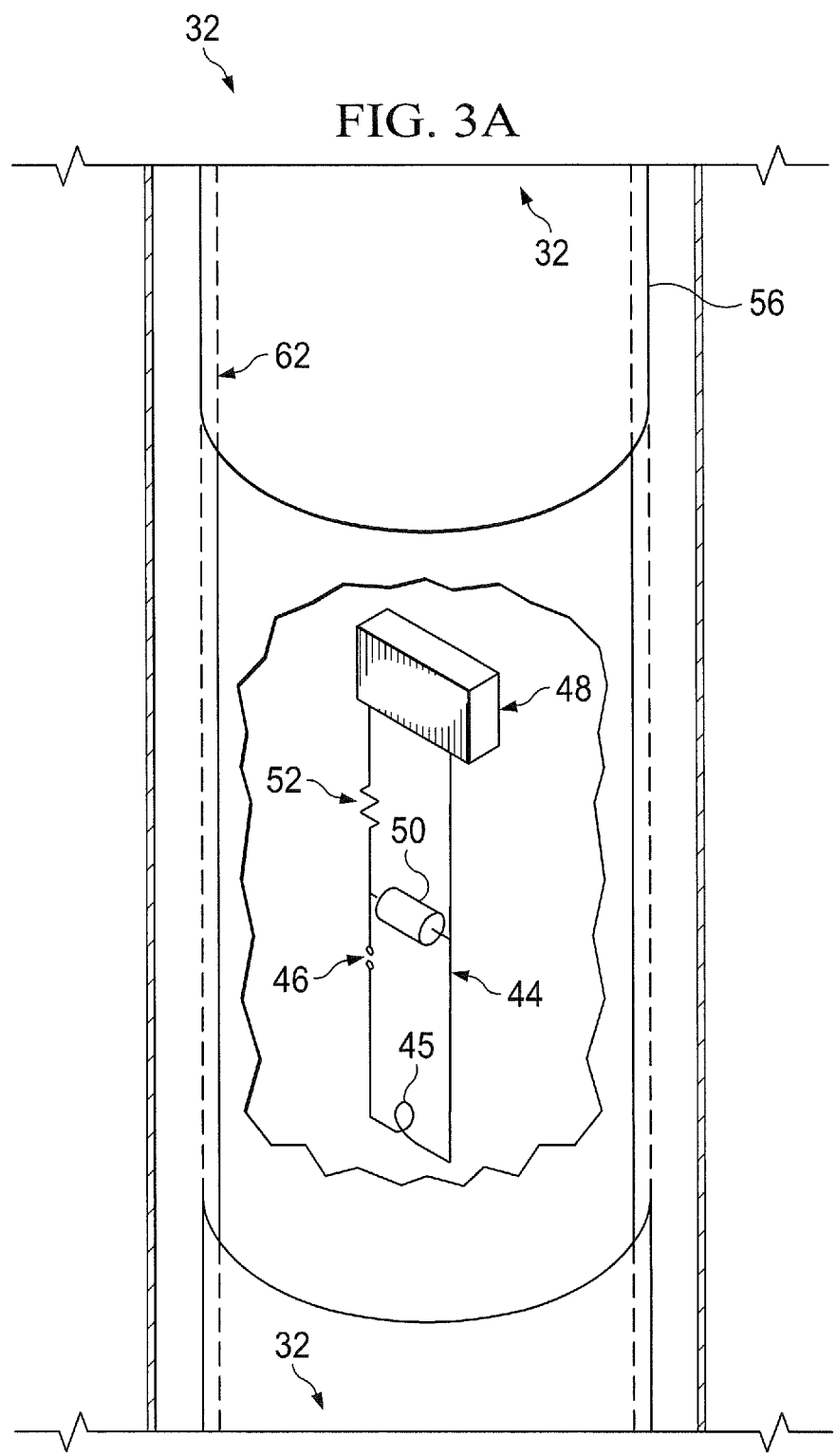

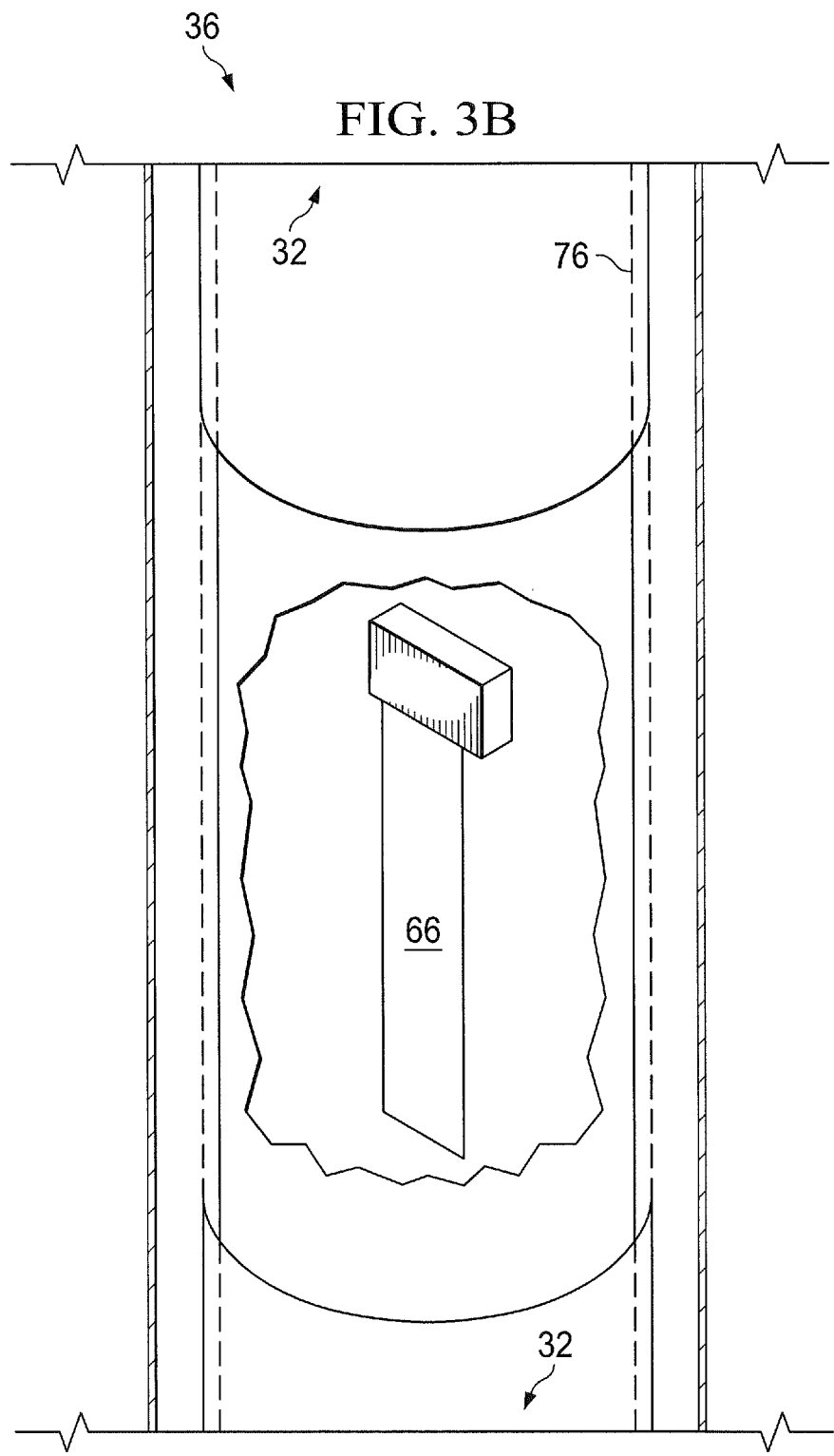

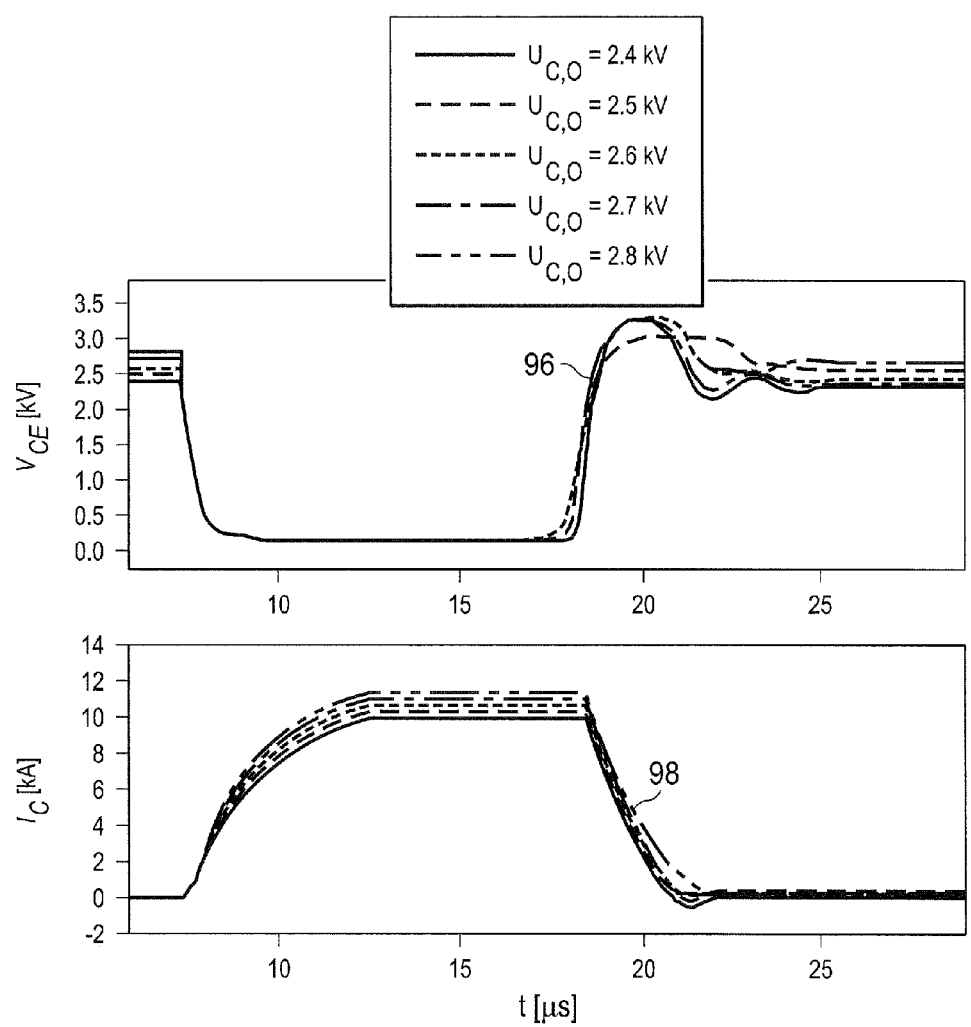

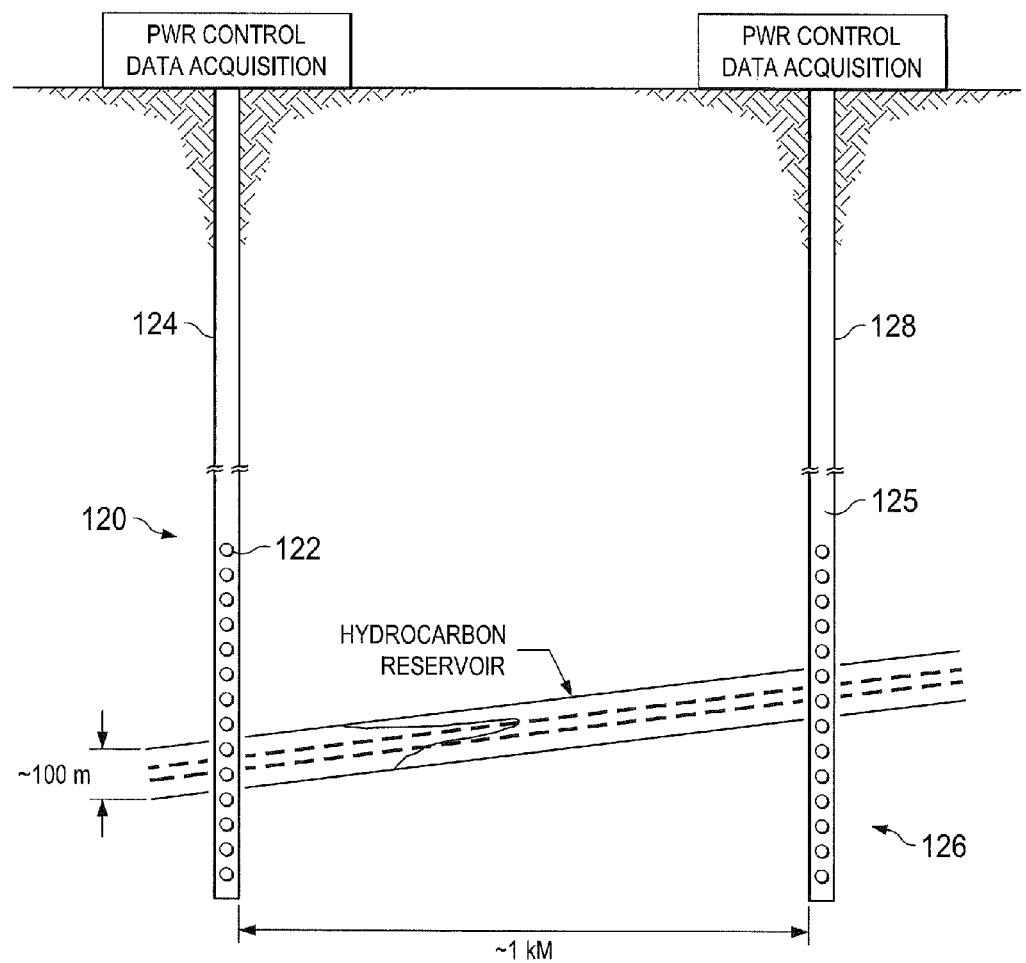

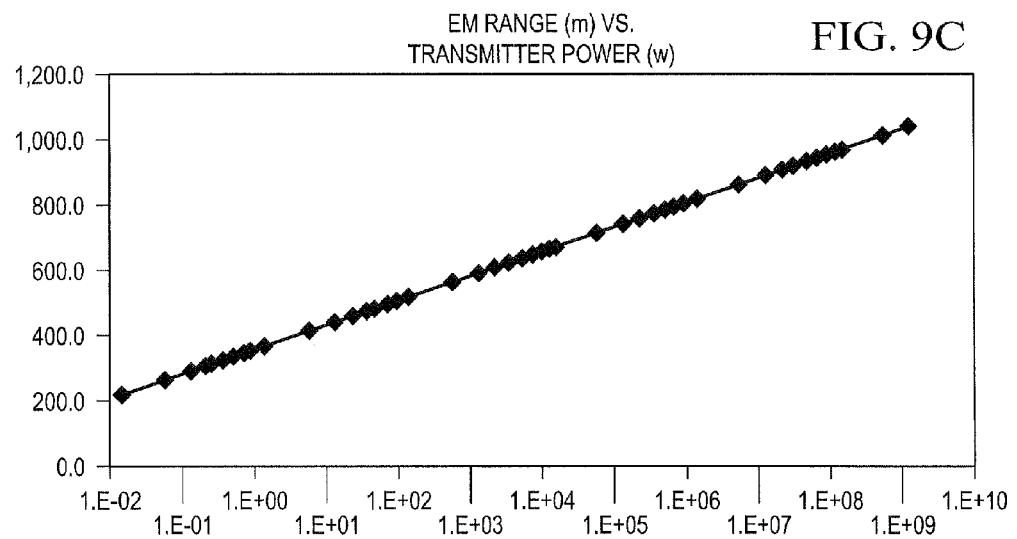
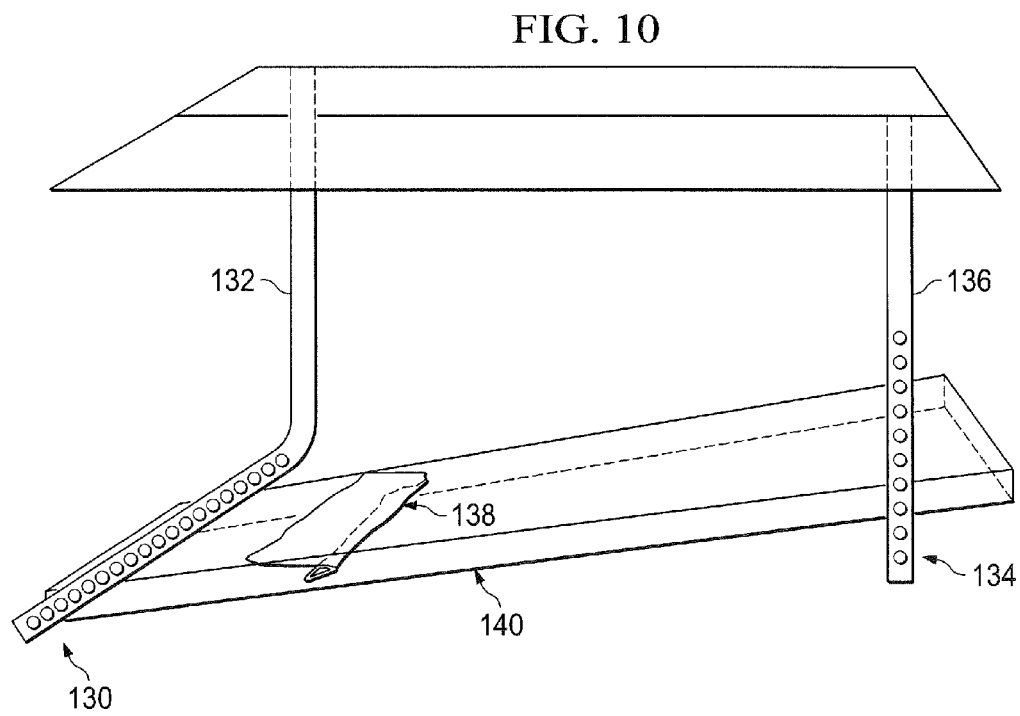

SUPER-RESOLUTION FORMATION FLUID IMAGING WITH CONTRAST FLUIDS

CROSS REFERENCE TO RELATED APPLICATIONS

The present application is a continuation in part of, and claims priority to, co-pending, commonly owned U.S. patent application Ser. No. 14/187,968, filed Feb. 24, 2014, and commonly-owned U.S. patent application Ser. No. 13/707,721, filed Dec. 7, 2012, and to its related U.S. Provisional Application No. 61/568,403, filed Dec. 8, 2011, priority for each of which is claimed under 35 U.S.C. §120.

BACKGROUND OF THE INVENTION

1. Field of the Invention

The present invention relates to imaging sub-surface structures, particularly hydrocarbon reservoirs and fluids therein, and more particularly to cross-well and borehole-to-surface electromagnetic (EM) surveying.

2. Description of the Related Art

Cross-well and borehole-to-surface electromagnetic (EM) surveying have involved continuous-wave (CW) EM sources placed in one borehole and receivers/sensors which detected the phase and amplitude of the EM signal in a distal borehole, using multiple source and receiver positions. The data readings were used to generate a synthetic time domain version of the signal, and inferred transit times were used along with source/receiver geometry to create a 2D conductivity matrix or image of the inter-well plane via inversion with ray-tracing.

Brine which is electrically conductive is everpresent in hydrocarbon reservoirs, and the presence of brine attenuated EM signals in proportion to their frequency. The presence of brine, as well as the large inter-well distances on the order of 1 kilometer or more, and thermal noise limits in conventional receivers caused continuous-wave EM surveys to require very low frequency operation, usually about 200 Hz. The low frequency operating range which was required severely limited cross-well imaging resolution as it: a) is in a diffusive regime, and b) had a very large wavelength. At present, so far as is known, a spatial resolution of only $1/10$th to $1/20$th of the inter-well spacing has been obtainable.

Since practical spacing for boreholes in hydrocarbon reservoirs usually span hundreds to thousands of meters and such reservoirs are usually associated with electrically conductive brines, significant EM signal attenuation across a reservoir has been encountered. Such attenuation is frequency-dependent, such that higher frequencies are attenuated more than lower frequencies. Since higher frequencies have shorter wavelengths, and therefore afford better imaging resolution, it would be advantageous to operate at the highest frequency that still gives a detectable signal after transiting the reservoir region of interest. However, the presence, concentration and distribution of brines are generally unknown prior to investigation, and the optimal frequency for investigating the reservoir with EM surveying could not be determined in advance.

SUMMARY OF THE INVENTION

Briefly, the present invention provides a new and improved method of electromagnetic imaging of formation of a subsurface hydrocarbon reservoir structure containing fluids. An injection fluid containing particles to change the electromagnetic character of the reservoir where fluids are present is introduced into the reservoir structure. Pulses of electromagnetic energy signals are emitted to travel through the reservoir. Waveforms of the emitted electromagnetic energy signals received at a plurality of electromagnetic sensors are recorded. A measure of the travel time of the signals received at the plurality of electromagnetic sensors is formed. The received signals are decomposed into their frequency components, and travel time data of the received signals extracted as a function of frequency. Based on the extracted travel time data as a function of frequency, an inverted velocity image is formed of subsurface features of the subsurface hydrocarbon reservoir.

BRIEF DESCRIPTION OF THE DRAWINGS

FIG. 3A is a schematic diagram of a transmitter of electromagnetic energy for an electromagnetic survey.

FIG. 3B is a schematic diagram of a receiver of electromagnetic energy for an electromagnetic survey.

FIG. 6B is a plot of an example voltage and current waveform generated by the pulse generator of FIG. 6A.

FIG. 8 is a schematic diagram of an example borehole to borehole electromagnetic survey according to the present invention.

FIGS. 9A, 9B and 9C are plots of range versus power for various frequencies and conductivities of subsurface media.

FIG. 10 is a schematic diagram of another borehole to borehole electromagnetic survey according to the present invention.

DETAILED DESCRIPTION OF THE PREFERRED EMBODIMENTS

Figure 1:
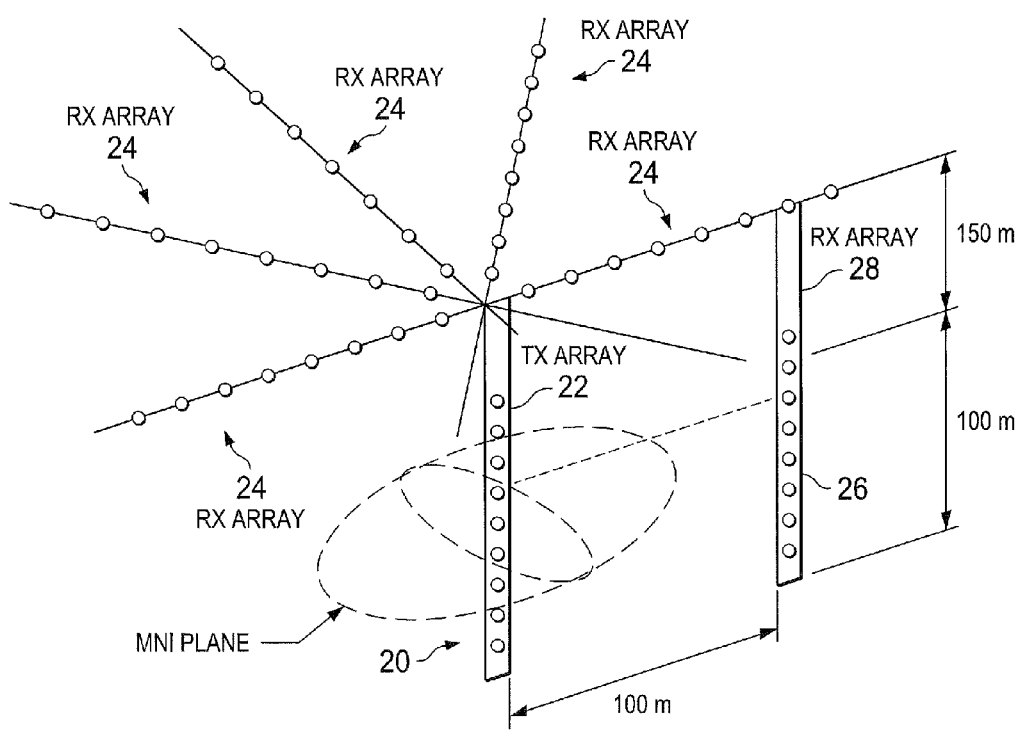
FIG. 1 is a schematic diagram of a transmitter-receiver array for a borehole to surface electromagnetic survey.

By way of introduction, the present invention involves imaging sub-surface structures, particularly hydrocarbon reservoirs and fluids therein. The primary approach is related to cross-well and borehole-to-surface electromagnetic (EM) survey technology. The present invention specifically focuses on fully time-domain data acquisition using high-power pulsed EM sources. The present invention can also include spatial over-sampling and super-resolution data processing technology to improve image resolution. The present invention can also utilize magnetic materials to provide image contrast for regions containing injected fluids.

An improved approach to cross-well EM imaging is provided, using a combination of high-power pulsed magnetic field sources, fully time-domain signal acquisition, modern low-noise magnetic field sensors, spatial oversampling and super-resolution image enhancement and injected magnetic nanofluids. The approach provided by the present invention generates inter-well images mapping EM signal speed (group velocity) rather than conductivity maps. Conventional continuous wave (CW) sources are typically limited to about 1500 watts in the down-hole environment. In contrast, pulsed sources according to the present invention facilitate simple time-of-arrival data acquisition schemes and readily support megawatt transmitters. As will be described, simple current loop transmit antennas can be driven from fast-discharge energy sources (capacitors) through Blumleins, Marx generators, simple spark gaps, pulse forming LC networks or other sources to generate the requisite current and power levels. Higher power levels increase range and/or operating frequency in cross-well EM imaging. Using such sources and available modern magnetic field sensors (such flux gates, SQUIDs, search coils and the like) with noise figures in the pico- to femto-Tesla per Hz range, substantial improvement in the P/N ratio (transmit power to receiver thermal noise) are available compared to the prior art. Since the hydrocarbon reservoir fluid structure and composition changes only slowly, time is available to perform such measurements with relatively small transmitter/receiver positioning steps. This 'oversampling' is used with super-resolution image deconvolution methods to improve image resolution by a factor of three to ten, depending on the amount of over-sampling performed. Finally, fluids (typically water) loaded with magnetic nanoparticles can be injected, which readily reduces group velocity by five to ten percent compared to pure water. This fluid can be imaged against a background of native or previously injected water. In a water-flood environment, this is useful to determine dynamic flow paths of injected fluids. Accordingly, the present invention provides EM velocity maps with up a resolution of up to $100^{th}$ (i.e., 5 to 10 times greater than previously available) of the inter-well spacing for both native and injected fluids.

With the present invention an electromagnetic (EM) pulse with known characteristics is generated from a high power, pulsed electromagnetic pulsed EM source at one location in or near subsurface reservoir. The emitted pulsed EM signal is transmitted through the reservoir and recorded at one or more other EM energy receivers after travel through the subsurface formations of the reservoir. The EM signal recorded after transiting the reservoir differs from the transmitted signal in characteristics (e.g. time, amplitude, power spectrum, etc.) that depend on the properties of the intervening medium (e.g. the reservoir) and spatial variations of those properties.

In FIG. 1, an example arrangement of EM survey locations for a source array 20 of transmitters Tx disposed in a well bore or borehole 22 to emit EM energy. In FIG. 1, a suitable number of arrays 24 of EM energy receivers Rx are disposed on the earthen surface forming what is known as a borehole to surface array. As also shown in FIG. 1, another set or array 26 of EM energy receivers Rx is disposed in another well borehole 28 spaced from the transmit borehole 22.

Figure 2:
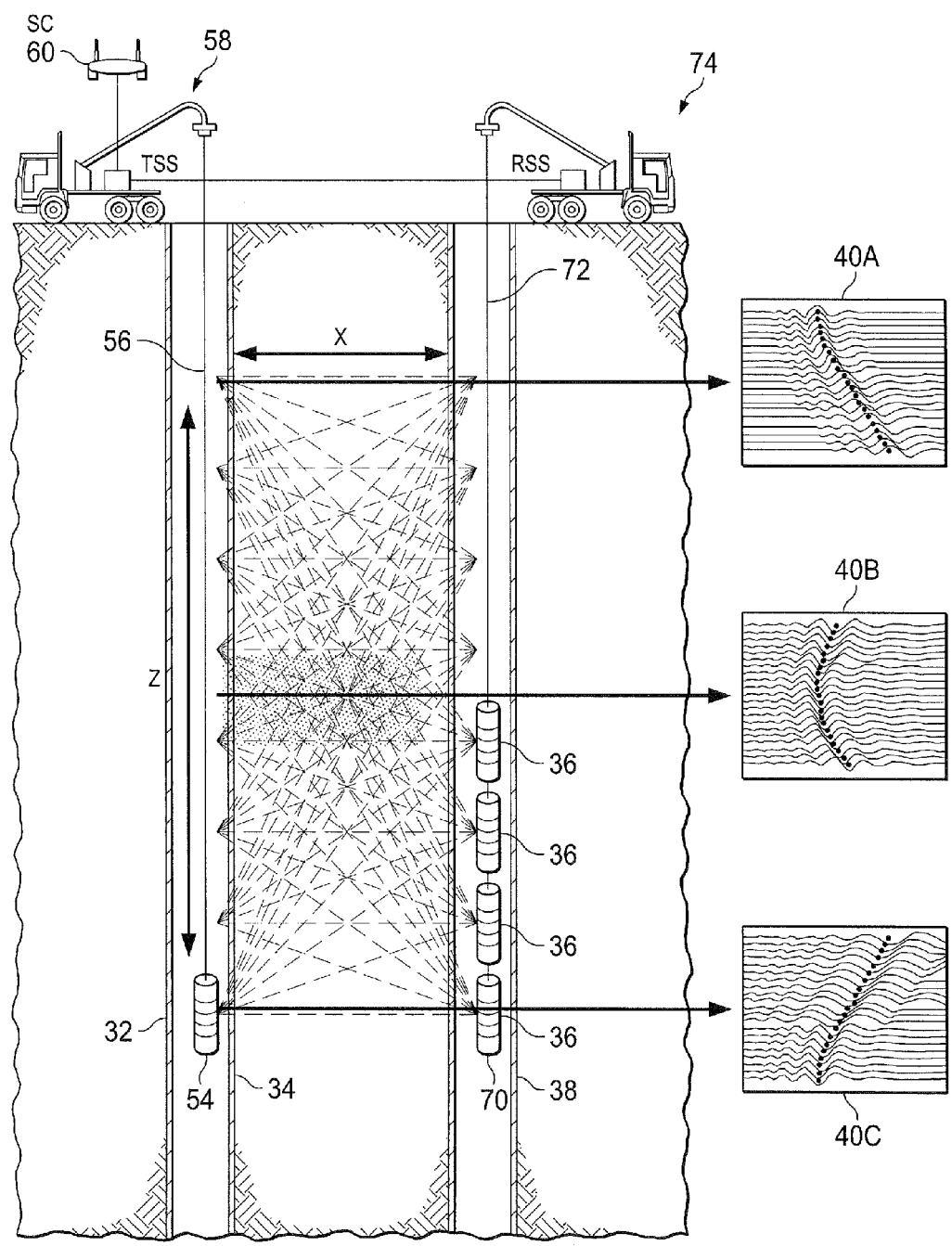
FIG. 2 is a schematic diagram of a transmitter-receiver array for a borehole to borehole electromagnetic survey.

Transmitters Tx may be placed within a borehole or at the surface of the terrain. Likewise, receivers Rx may be placed within a borehole or at the surface of the terrain. More than one borehole may be employed; and such a configuration is generally called 'cross-well'. If only one borehole is employed in conjunction with a surface array, the configuration is generally called 'borehole-to-surface'. Both of these configurations are shown in FIG. 1. Generally, at least one borehole is employed so that EM signals can traverse the region of interest A multitude of EM energy measurements are performed with different combinations of transmitter and receiver locations in order to sample various parts of the reservoir from different directions, as shown in FIG. 2. In FIG. 2, a number of transmitters 32 in a transmit borehole 34 emit high power pulsed EM energy to transit subsurface earth formations to a set of receivers 36 in a receiver borehole 38. Waveform displays such as those shown at 40a, 40b and 40c represent example readings from receivers 36 at certain depths as functions of EM signal travel time. Multiple measurements of transmissions such as those shown in FIG. 2 may be summed or averaged at a given transmitter and receiver location pair to improve signal to noise ratios. Multiple transmitters (e.g. an array) may be employed, as well as multiple receivers (e.g. an array). Generally, transmitters and receivers, either individual or arrays thereof, are placed at multiple locations to sample various parts of the reservoir and sampling each part from different directions.

According to a preferred embodiment of the present invention loop antennas and pulsed currents transmitters generate high power EM signals, as shown in FIGS. 3A and 3B. An example such transmitter 32 (FIGS. 2 and 3A) includes a loop antenna 44 with a spark gap 46 is connected to a power supply high voltage module 48. A capacitor 50 is connected in the loop antenna 44 across the leads from the power supply module 48, and a load resistor 52 is connected between the power supply module 48 and the spark gap 46.

An example transmitter 32 of FIG. 3A is one of a number of such units as shown schematically in FIG. 2 and is mounted with a tool or sonde 54 lowered by a supporting wireline 56 from a vehicle 58 at the surface. The transmitter 32 and other transmitters shown in FIG. 2 are moved to a number of depths in a transmit wellbore during EM surveying. A system control unit 60 associated with the vehicle 58 at the surface sends signals or pulses over the wireline as indicated at 62 to provide the energy for the pulses being transmitted. Once enabled, the high voltage power supply 48 charges up an energy storage capacitor 50 through a current limiting resistor 52 until it reaches the break-down voltage of a spark-gap 46. The current pulse is discharged through the loop antenna 44, which may have more than one turn or loop. A small current loop 45, or sense coil, is supplied to capture a small portion of the magnetic field generated by 44; the sense coil 45 is connected to a coaxial cable 56 that is used to provide a start-signal to recording apparatus or instrumentation. It should be understood that other fauns of transmitter may be used, as well.

An example receiver 36 (FIGS. 2 and 3B) includes a loop antenna 66 connected to a recording instrumentation or oscilloscope module or card 68. The receiver 36 of FIG. 3B is one of a number of such units as shown schematically in FIG. 2 and is mounted with a tool or sonde 70 lowered by a supporting wireline 72 from a EM logging vehicle 74 at the surface. The receiver 64 and other receivers shown in FIG. 2 are moved to a number of depths in a receive wellbore during EM surveying. Recording and processing instrumentation associated with the EM logging vehicle 74 at the surface, on command from surface recording and processing instrumentation over 'start bus' in wireline 72, sends records of high energy EM pulses back over the wireline 72 as received after transit through the reservoir of interest from the transmit wellbore.

The records are then stored on computer 60 and available for further processing and computerized analysis. It should be understood that other forms of receiver may also be used.

Figure 4:
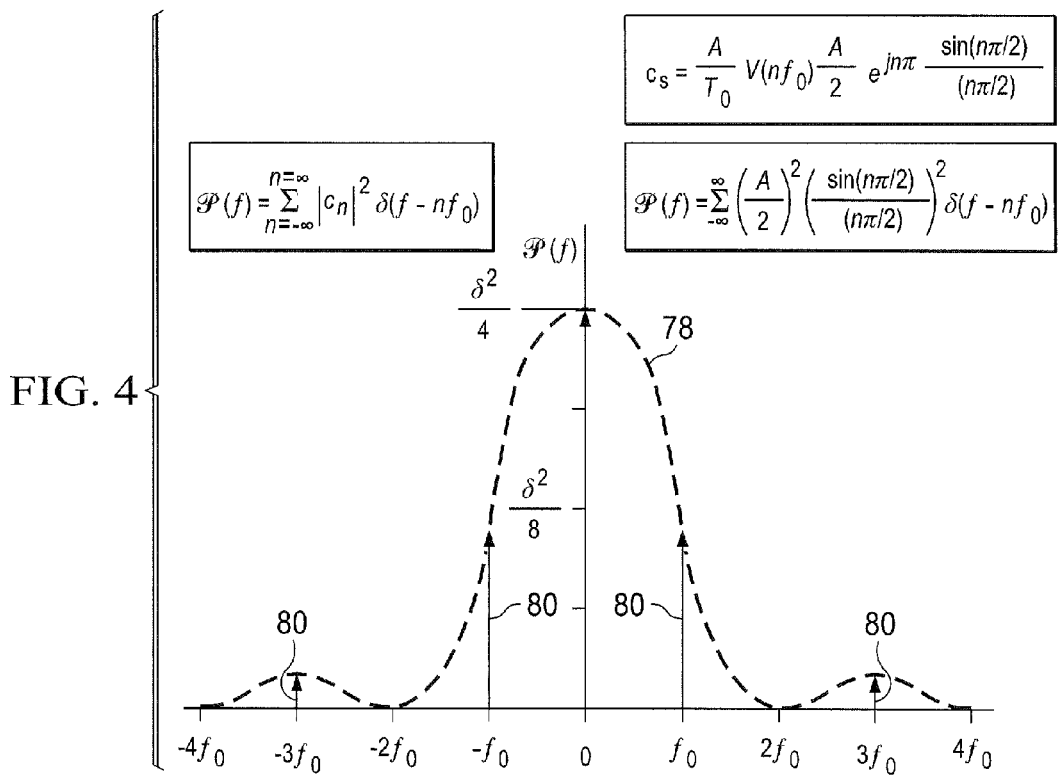
FIG. 4 is a plot of a power spectrum for a square wave electromagnetic energy signal.

According to the present invention, generally square current pulses of high energy EM energy and selectable length and rise-time are provided as the generated EM signal from the EM energy transmitters. Such EM pulses are advantageous because they are relatively simple to generate and control and contain a broad range of frequency components. FIG. 4 shows a representative power spectrum for both a single (dotted envelope 78) and repetitive (arrows 80 at $f_0$ and its odd harmonics) pulses of the type emitted by transmitters according to the present invention.

Since practical spacing for boreholes in hydrocarbon reservoirs usually span hundreds to thousands of meters, and further since such reservoirs are usually associated with electrically conductive brines, significant EM signal attenuation across the reservoir has almost universally been encountered. Such attenuation is frequency-dependent, and thus higher frequencies are attenuated more than lower frequencies. Since higher frequencies have shorter wavelengths, and therefore afford better imaging resolution, it has with the present invention been advantageous to operate at the highest frequency that still gives a detectable signal after transiting the reservoir region of interest. Since the presence, concentration and distribution of brines are generally unknown prior to investigation, the optimal frequency for interrogating the reservoir cannot be determined in advance. Therefore, according to the present invention an inherently broadband EM source has been utilized, as is provided by the square pulsed loop antenna transmitter 32 shown in FIG. 3A.

A further advantage provided with the present invention is the ability to dynamically control the length of the emitted EM energy current pulse. Reducing the length of the current pulse increases $f_0$ and pushes the envelope towards higher frequencies, ensuring that the best possible resolution is obtained when imaging the reservoir at a given T-R spacing and signal power. Another useful feature of the signal shape utilized with the present invention occurs as a result of the frequency spectrum of the transmitted energy includes significant power at 0 Hz. This has value in conjunction with injected magnetic nanofluids, as will be described below.

A number of EM sources of a several conventional types may be employed as long as such a source includes some time-varying feature that can be used to determine travel-time across the reservoir and it has enough power to allow detection at the receiver location. The preferred source includes a loop antenna like that shown schematically at 32 in FIG. 3A, which may have multiple conductor turns. This antenna is preferably driven by a pulsed high current square wave, as has been described. This current profile may be conveniently generated by a pulse forming circuit such as the type known in the art as a Blumlein circuit or a type known as a thyristor circuit. It should be understood that suitable circuits and sources may of course be used.

Figure 5A:
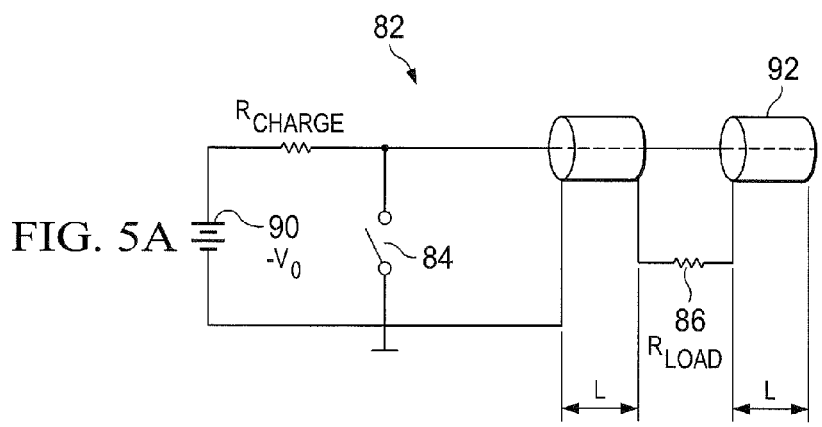
FIG. 5A is a schematic electrical circuit diagram of a pulse generator for an electromagnetic survey.
Figure 5B:
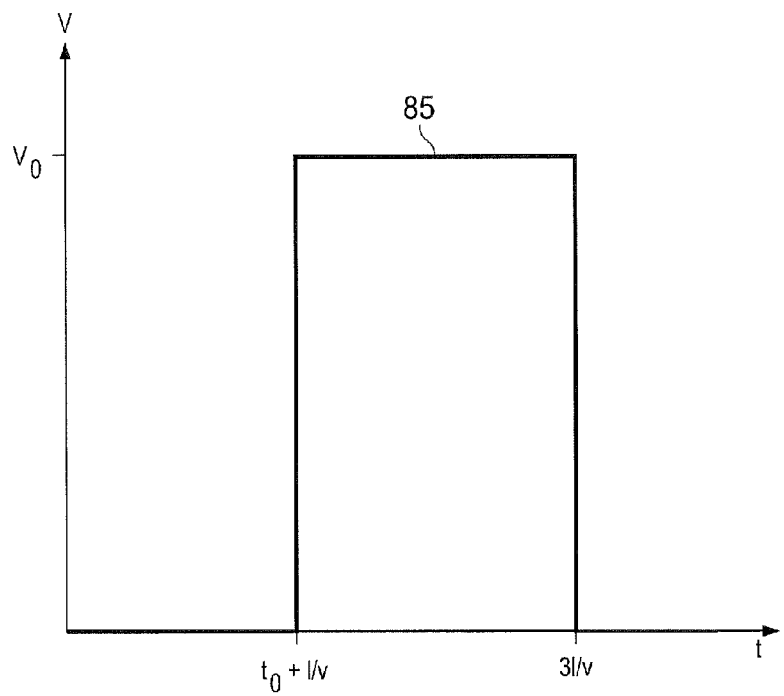
FIG. 5B is an example waveform of a pulse generated by the pulse generator of FIG. 5A.
Figure 5C:
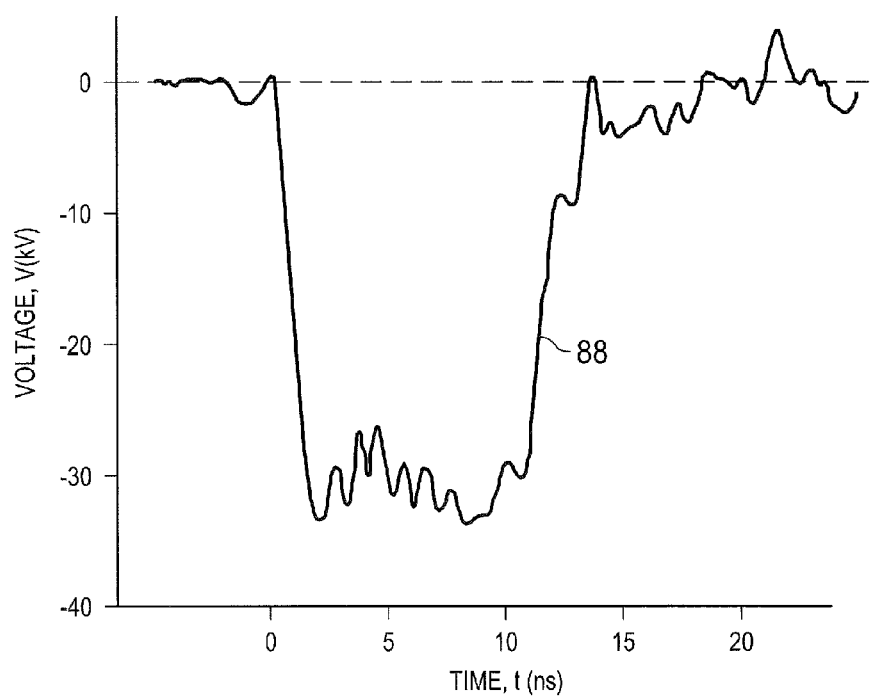
FIG. 5C is an example waveform of an actual pulse generated by a pulse generator for an electromagnetic survey.

An example Blumlein source is illustrated schematically at 82 in FIG. 5A. When a switch 84 is closed, an ideally rectangular pulse 85 as shown in FIG. 5B is applied across a load 86 that has the same impedance as the pulse generator 82. The amplitude of the pulse 85 shown in FIG. 5B is determined by the charging voltage and the pulse duration is determined by the length of the transmission lines and the propagation velocity, v, of the electrical signal. FIG. 5C is a plot of a single output pulse 88 from the Blumlein pulse generator 82 with a 10-ns time duration and an amplitude of 35 kV into a 10 ohm load. A pressurized spark gap provides a rise time of 1 ns.

The Blumlein source 82 typically employs a spark gap (although some versions may be triggered externally) to initiate the pulse. Energy is supplied by a high voltage power supply 90, and energy for the pulse for the purpose of EM surveying according to the present invention is stored in a high voltage coaxial cable or similar waveguide structure like that shown at 92 in FIG. 5A. The length of the EM surveying pulse is determined by the length of the coaxial cable 92 and the characteristic impedance and capacitance per unit length of the cable determines the delivered current, which arrives at a nominally constant rate. Since hydrocarbon reservoirs are often on the order of 10,000 feet below the surface, a coaxial cable delivering high voltage to an EM source in a borehole can conveniently serve as a Blumlein source like that shown in FIG. 5A and generate pulses on the order of 10 microseconds in length.

Figure 6A:
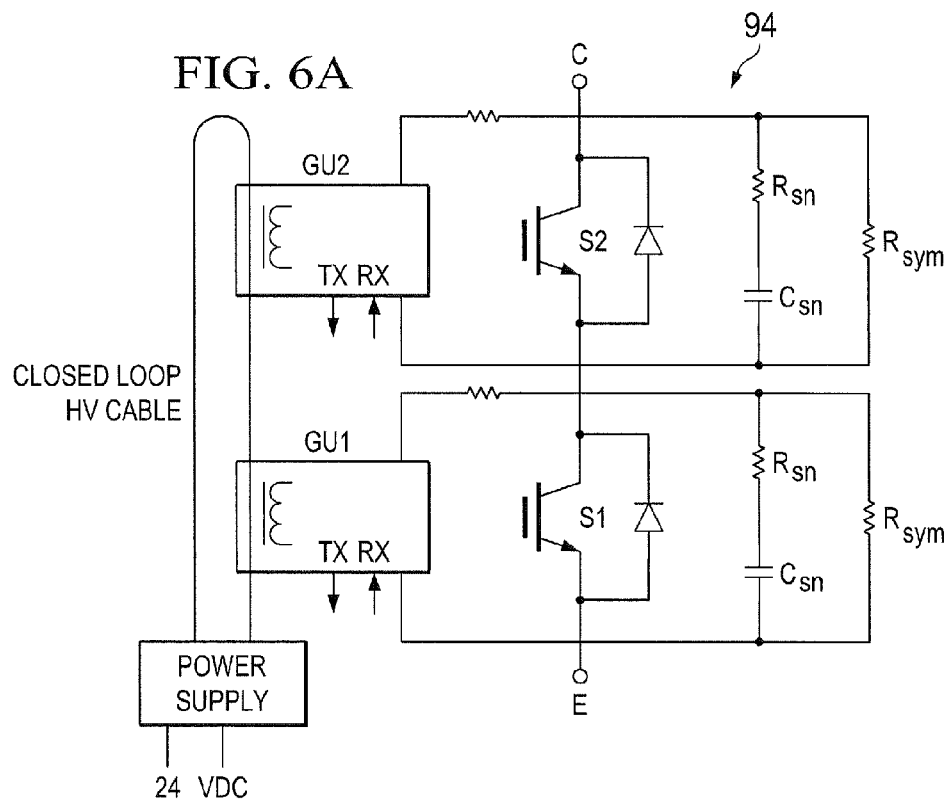
FIG. 6A is a schematic electrical circuit diagram of a semiconductor based pulse generator for an electromagnetic survey.

An alternative power supply for the EM source can be comprised of a capacitor bank and a high voltage switch, usually a thyristor device, as shown schematically at 94 (FIG. 6A). A set of waveforms 96 and 98 (FIG. 6B) illustrate voltage and current, respectively, for a maximum current pulse in accordance with the present invention. The term 'thyristor' is used to identify a class of closely related semiconductor devices including a SCR (silicon controlled rectifier) and an IGBT (insulated gate bipolar transistor). Such semiconductor devices deliver longer pulses where the length of a Blumlein source pulse would not be suitable. Such solid-state switches also offer lower maintenance and longer useful lifetimes compared to mechanical or gas discharge switches, with modest increase in cost and complexity. It should be noted that a thyristor could be used to switch the output of a Blumlein pulse generator, although the more common configuration is to use a capacitor bank for energy storage, and to limit or regulate the current output by selecting or controlling the impedance of the load device.

Receivers 36 used in the present invention preferably take the form of a magnetic field transducer and a time-domain recording device. The recording device may be as simple as a zero-crossing discriminator and a fast counter for recording the signal arrival time, or a more complex and costly transient recorder or digital oscilloscope module may be employed. It should be understood that a may be used. A simple and generally suitable transducer is a loop antenna, as depicted in FIG. 3B at 66 representing an example of a magnetic field sensor known as a 'search coil'. Search coils generally have many conductor turns to increase sensitivity.

Figure 7:
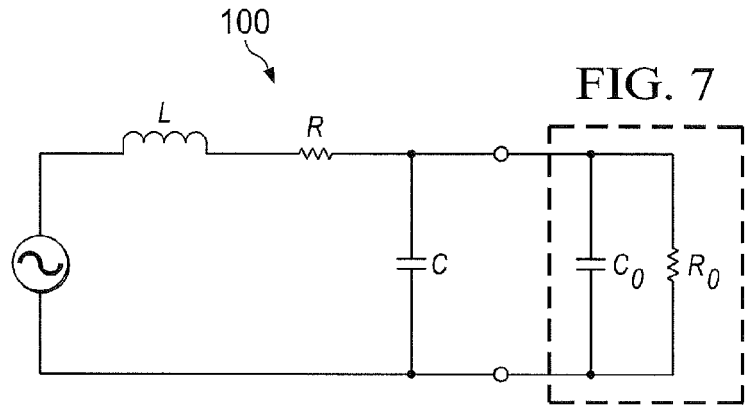
FIG. 7 is a schematic electrical circuit diagram of an equivalent circuit for an induction sensor for an electromagnetic survey.

It should be understood that a wide variety of devices may be used to capture the magnetic field generated by the EM source 42 and convert the sensed magnetic field readings into electrical signals that may be recorded for later analysis. Alternative sensors may include superconducting devices known as SQUIDs, fluxgates, Hall sensors and spin-valves. An exemplary search coil sensor is shown schematically in equivalent circuit form in FIG. 7 at 100.

Spatial and Temporal Oversampling

Super-resolution image enhancement comprises a further aspect of the present invention. Imaging resolution is often considered to be bounded by the diffraction limited resolution based on the wavelength of the EM probe. However, spatial oversampling can be performed in conjunction with an inversion model that includes some knowledge of boundaries and structure of the system. This is done to generate images with resolution well beyond what would normally be considered to be the diffraction limit—especially if the sampling is performed in the near-field.

A ready example comes from induction logging in the oil field. Induction logging often operates at a frequency around 1 MHz, which would indicate a wavelength and resolution on the order of 100 to 1000 meters, depending on the impedance of the formation. In practice, however, with appropriate inversion code and knowledge of the response of layered models of rock formations, useful resolution on the order of 1 meter or less is routinely achieved.

With the present invention, cross well EM imaging resolution of up to $1720^{th}$ of the interwell spacing is considered a practical and desirable goal. Indeed, in published literature a signal source emitting a continuous wave signal at a frequency of about 200 Hz was used with inter-well spacing of 850 meters to generate images with about 45 meter blocks. A distance of 45 meters is a miniscule fraction of the wavelength of a 200 Hz EM signal (1000 m in a medium with 0.05 Siemens conductivity). Thus, imaging resolution depends on sampling frequency much more that it does on the wavelength of the EM probe.

In contrast, with the present invention air-coil antennas oriented perpendicular to the borehole axis are employed. Further, broadband pulsed operation, and measurement spacing of 1 meter or less, especially around the locus of fluid injection and production are used.

Data Processing

Tomographic inversion converts data acquired in the field into images of the reservoir. An example of this processing is described by Abubakar, et al. ("A fast and rigorous 2.5D inversion algorithm for cross-well electromagnetic data", SEG Extended Abstracts, 2005 Annual Mtg. Houston, Tex.). The processing task requires solution of a full nonlinear inverse scattering problem that is usually ill-conditioned and non-unique. Their approach employs a finite-difference code as a forward simulator, wherein the configuration is numerically discretized using a small number of cells determined by the optimal grid technique. The forward problem is solved in each inversion step, and a LU decomposition method is used to obtain a solution for all the transmitters simultaneously. It is to be noted that the finite-difference approach so used in the prior art, based on coarse rectangular grid elements, introduces significant limitations (simplifications) on the forward solution in order to speed up the computations.

A slightly different approach was described in U.S. Pat. No. 5,373,443. The approach used was based on a solenoid (coaxial with a borehole) source driven by a pure sine wave and recording the amplitude and phase of the magnetic field at a distal borehole with another solenoid (also coaxial with the borehole). This measurement, called the diffusion field, was transformed mathematically into a wave field, and then signal velocity between source-receiver pairs was inferred from the wave field. These 'rays' were used to tomographically construct a conductivity map of the inter-well region.

In contrast, with the present invention a pulsed broad band EM source is employed, and the received waveform recorded in the time-domain. The travel times for each source-receiver pair are measured directly. Fourier transforms may then optionally be used to decompose the received signals into their various frequency components and thereby extract travel times as a function of frequency. The additional information thus made available can be used to improve an inverted velocity image when the medium has material dispersion—since different frequency components will have different travel times and diffraction paths in a ray-tracing model.

In addition, variable density adaptive (triangular) mesh elements are employed in a finite-element model for generating forward solutions, similar to the meshing approach used in COMSOL Multi-Physics. This approach increases the mesh density close to the source and receiver regions. Since geologic models are normally coarse and blocky, at least a dual grid paradigm is employed for generating velocity images of the region of interest.

The objective according to the present invention is to detect and monitor the path of injected fluids. Thus, as a further refinement/embodiment a streamline model is employed for estimating the path and volumes of injected fluids. Streamline simulators transform a 3D block model into a number of flow paths of nominally constant flux. While the paths are inherently 3D, they can be solved independently as essentially one dimensional problems, increasing computational efficiency tremendously. Since each streamline operates independently, they can also be treated as a quasi-orthogonal basis set for comprising the total flow of injected fluids.

Using the initial geology model and pre-injection EM data, a forward solution of the impact (change in EM field and propagation) of fluid injected along each streamline can be computed independently. A linear sum of these components can then be determined that best fits the observed EM field and travel times observed after injection of fluid for a period of time. The results can be mapped back onto the original geologic model to update fluid compositions as a function of time as well as indicate appropriate porosity and permeability changes in the underlying geologic model. This approach thus employs a tri-grid modeling system: Cartesian blocks for the geologic model, streamlines for fluid flow and variable triangular meshes for EM transport in a quite different fashion form than conventional processing.

Contrast Imaging and Contrast Fluids

Electromagnetic contrast enhancement, whether magnetic or dielectric, provides a unique signature for injected fluids. The reservoir fluids (oil, gas, water, brine) and reservoir rocks generally have essentially zero magnetic character. Another aspect of the present invention employs injected fluids as contrast fluids to change the electromagnetic character, either magnetic or dielectric, of the reservoir volume invaded by such contrast fluids. This may be accomplished by loading the injection fluid with pre-fabricated magnetic nanoparticles or non-magnetic chemicals that can subsequently react when inside the reservoir to generate magnetic materials, or with molecular or nanoparticles to increase the relative permittivity or dielectric constant $\in$ of the reservoir volume.

The present invention thus provides imaging a locus or location of interest within the reservoir based on injected fluids loaded with materials specifically intended to provide slowness contrast. Due to the micro-porous nature of the hydrocarbon reservoir, these materials are preferably nanoparticles, sized for example up to about a micron in diameter. Particles with a diameter of up to about 20% of the diameter of the majority of pore throats in the reservoir matrix may also be used.

In imaging velocity according to the present invention, by increasing either the relative permittivity $\in$ or magnetic permeability $\mu$ increases the slowness of the electromagnetic pulses of the probe signal. Since the reservoir typically has little or no magnetic material, it is easiest to get contrast with a magnetic or $\mu$ contrast fluid material. In addition, there are high relative dielectric permittivity or $\in$ materials available, ranging from ferrites to ferroelectrics and conjugated conductive polymers. Also, the dielectric permittivity may be increased with suspensions of conductive particles, carbon nanotubes being an example.

The group velocity of an EM signal depends on the dielectric permittivity and magnetic permeability of the medium in a very simple way: $v=(\epsilon\mu)^{-1/2}$. Thus, by injecting a fluid with $\mu=10$ into a formation with 20% porosity, that reservoir volume will have an effective magnetic permeability of 2, and the velocity of an EM wave traversing it will decrease by about 30% ($1/1.414$). This time shift is easily detectable with modern waveform recording instruments.

Transient Polarization & Relaxation of Magnetically Modified Geological Structures Another aspect of the present invention involves observing delayed magnetic transient response of magnetic materials in the reservoir after injecting fluids. It is to be noted that magnetic materials channel magnetic flux in much the same way that good conductors channel electric fields and electric currents. Thus, the long-pulse nature of the EM source employed with the present invention magnetically polarizes modified regions of the reservoir in the vicinity of the EM source. EM energy is converted and stored in the form of a static magnetic field within the modified portion of the reservoir. When the pulse ends, the magnetic field decays, possibly in a resonant fashion, with characteristics that depend on the magnetic permeability of the region, as well as the dimensions of the magnetized region. This magnetic field can be detected both at the distal receivers (in another borehole or at the surface), or alternatively back in the source borehole by using the source antenna as a receiver.

The total magnetic energy stored in the modified region can be inferred from its B-field magnitude and temporal decay characteristics as observed in the source region. Similarly, distal receivers will observe a significantly increased B-field strength at frequencies corresponding to the RLC time constant of the magnetized reservoir volume. In a sense, the modified reservoir volume acts as a magnetic antenna, and moves the apparent EM source closer to the receivers. Give the exponential nature of attenuation in the reservoir, flood front anomalies generate significantly increased signal strength at the receivers. Detecting such invasive anomalies is another important aspect of the invention.

Another aspect of the present invention includes using a series of magnetic pulses of different lengths at a given source location. Locations with deeper fluid infiltration take longer to fully magnetize, and the depth of infiltration can be inferred from the time to magnetize that region, as well as the length of the decay time as described above when the source is switched off.

Another aspect of the present invention involves magnetization of the fluid modified reservoir volume from a distant EM source, which may be in another borehole, or may be situated at the ground surface. A surface source is particularly convenient because it may be moved around freely and because removing the borehole geometric constraints, permits larger and more powerful EM sources.

In operation, a basic cross-well configuration shown in FIG. 8 is utilized in much the same way as depicted in FIG. 2. EM pulses are generated at each of the plurality of TX locations 122 indicated in a first borehole 124, and the EM pulses are recorded at each of the plurality of RX locations 126 indicated in a second borehole 128. This matrix of observations is used to determine the travel time and signal strength as a function of frequency between each of the TX-RX location pairs. Inversion generates a 2D image of the EM velocity over the nominally planar surface containing the pair of nominally parallel boreholes. The EM velocity in water-filled rock is about four times slower than in oil filled rock. The EM velocity of magnetically modified injection fluid or magnetically modified reservoir volume can be from fractionally slower to several times slower than water-filled rock. Conductivity and magnetic permeability tend to attenuate the EM signal in general, so the amplitude (or power) of the signal as a function of frequency indicates the average conductivity or product of conductivity and (magnetic) permeability along the line connecting a given TX-RX location pair. This information provides another constraint besides simple group velocity and can be used during inversion to improve image quality and accuracy. The process should be performed prior to injection of fluids to capture the state and structure of the pristine hydrocarbon formation. The process is repeated periodically to image the progress of the flood front and/or modified reservoir volume as a function of time.

An important advantage to the broad-band pulsed (all the way down to 0 Hz, FIG. 4) EM source used in the present invention essentially makes certain that some detectable signal from source to receiver is obtained, regardless of the distance and conductivity of the medium. Also made certain is that the highest frequency that can traverse the distance and remain detectable is being generated and sampled. The present invention therefore provides the maximum signal and resolution (shortest wavelength) possible in a given field situation and configuration.

FIG. 8 is a diagram of an example EM surveying configuration according to the present invention. A simple pulsed source is formed based on a loop antenna, with a spark-gap trigger (which could be a thyratron, thyristor or comparable solid-state switch), and a Blumlein generator comprised of a long high-voltage coaxial cable connecting the surface components to the transmitter 120 in the borehole. Using a typical 50-ohm coaxial cable a current pulse proportional in length to the length of the cable (about 1 ns per foot of cable) is generated. The power provided to the discharge and downstream components (e.g. the coil antenna) is determined by several parameters: the capacitance per foot of the coaxial cable, group velocity, characteristic impedance and charging voltage. The current is primarily limited by the characteristic impedance of the coaxial cable, and the discharge power given by V*I. Using typical relationships for skin depth and attenuation of an EM signal as a function of frequency and conductivity of the medium, reasonable ranges can be computed over which a detectable signal can be observed using conventional components. A loop antenna, constructed as a search coil, with a detection limit of about −100 dB is assumed as a receiver 125 in the distal borehole 128. In this simple arrangement the key parameters are the charging voltage and the conductivity of the medium, and these factors determine the maximum frequency that is readily detected at the distal borehole 128. Discharge power scales with the square of the coaxial voltage. With a typical capacitance of 30 pF per foot, a charging voltage of 1,000 volts yields an output power of about 15,000 watts; 10 kV yields about 1.5 MW; 100 kV yields about 0.15 GW. Plots of range vs. power under various assumptions of frequency and average conductivity of the medium detailed below in Tables I, II, and III are set forth in FIGS. 9A, 9B and 9C, respectively.

TABLE I

| ANHYDRITE | | |
|---|---|---|
| cpf | 3.00E−11 | capacitance per foot |
| DL | −100.00 db | detection limit |
| sigma | 0.00005 S/m | conductivity |

TABLE I-continued

ANHYDRITE

| | | |
|---|---|---|
| freq | 1,000,000 Hz | frequency |
| lambda | 4.47E+02 m | wavelength |
| atten | 0.1 db/m | attenuation |
| Z | 50 ohm | impedance |
| SD | 73.57180382 m | skin depth |
| NormRange | 1471.436076 | 20 SD range |

TABLE II

OIL-FILLED ROCK

| | | |
|---|---|---|
| cpf | 3.00E−11 | capacitance per foot |
| DL | −100.00 db | detection limit |
| sigma | 0.005 S/m | conductivity |
| freq | 50,000 Hz | frequency |
| lambda | 2.00E+02 m | wavelength |
| atten | 0.3 db/m | attenuation |
| Z | 50 ohm | impedance |
| SD | 32.90231092 m | skin depth |
| NormRange | 658.0462183 | 20 SD range |

TABLE III

BRINE-FILLED ROCK

| | | |
|---|---|---|
| cpf | 3.00E−11 | capacitance per foot |
| DL | −100.00 db | detection limit |
| sigma | 0.5 S/m | conductivity |
| freq | 500 Hz | frequency |
| lambda | 2.00E+02 m | wavelength |
| atten | 0.3 db/m | attenuation |
| Z | 50 ohm | impedance |
| SD | 32.90231092 m | skin depth |
| NormRange | 658.0462183 | 20 SD range |

Figure 9A:
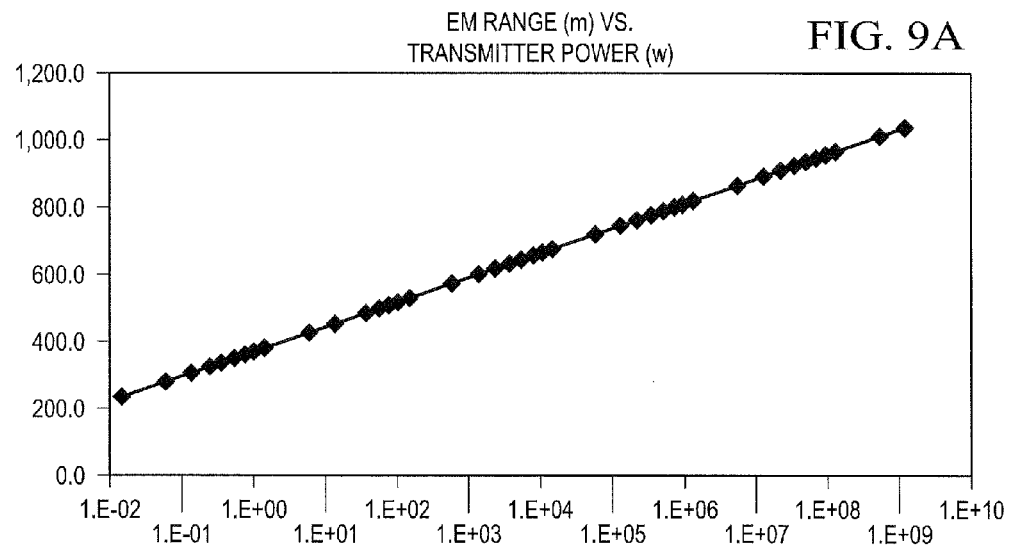
Figure 9B:
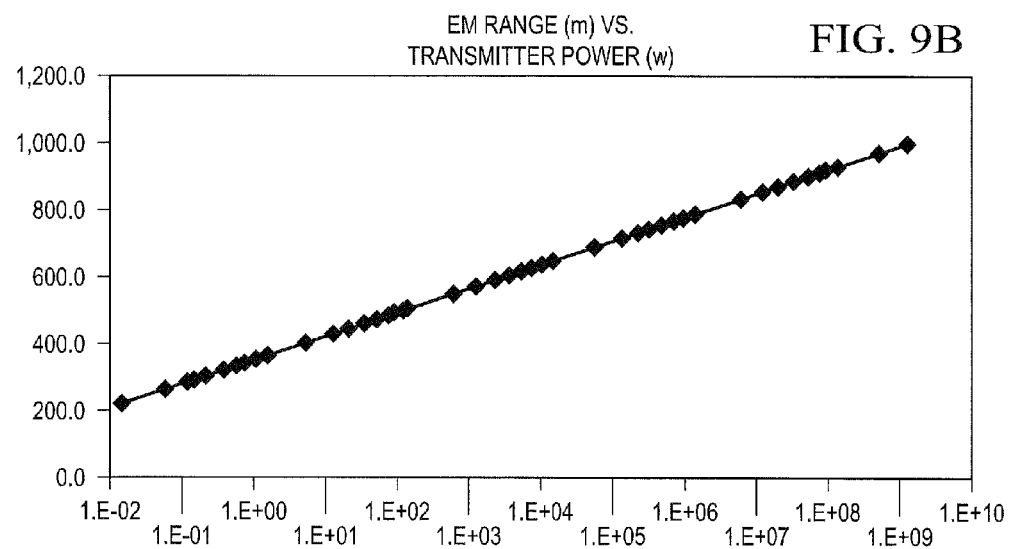

Nominal conductivities for various materials include: anhydrite (FIG. 9A): 0.00005 S/m; oil-filled rock (FIG. 9B): 0.005 S/m; and brine-filled rock (FIG. 9C): 0.5 S/m. The nominal conductivity of seawater is 5 S/m. FIGS. 9A, 9B and 9C present tables for anhydrite, oil-filled rock and brine-filled rock, respectively, with operating frequencies detectable at 1 km.

In a commonly occurring situation (FIG. 10) where a reservoir is produced using a combination of peripheral horizontal injector wells for water flooding or pressure maintenance and vertical producer wells elsewhere in the reservoir, EM TX arrays 130 in an injector well 132 and RX arrays 134 in a producing well 136 are deployed as shown in FIG. 10. Other than a non-planar sample volume, operational details are like those described in connection with FIG. 8 above. The configuration of FIG. 10 is useful for visualizing progress of an oil-water contact line or fluid front 138 over time while a formation 140 in the reservoir is produced. This information is vital for optimizing reservoir management.

Figure 11:
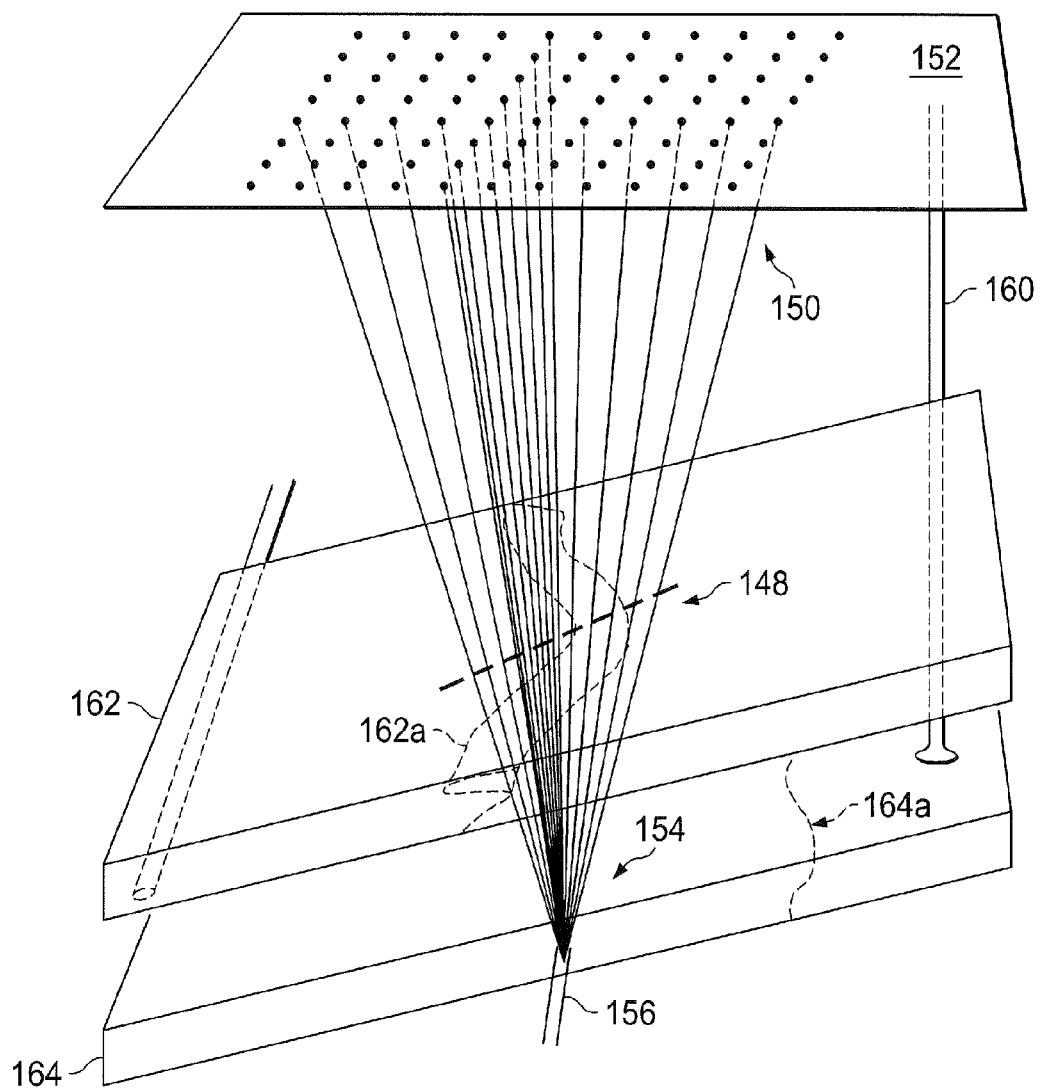
FIG. 11 is a schematic diagram of another borehole to borehole electromagnetic survey according to the present invention.

The configuration shown in FIG. 11 provides an improved projection of the oil-water contact (or flood front) compared to that of FIGS. 8 and 10, and is especially useful in detecting flood-front anomalies that arise from super-K zones or fracture corridors as indicated at 148. EM TX arrays 150 arranged over ground surface 152 and RX arrays 154 in a horizontal injector well 156 are deployed as shown in FIG. 11. A vertical producer well is shown at 160. Production is being had from two reservoirs 162 and 164, each with a fluid front as indicated at 162a and 164a, respectively. The configuration illustrated in FIG. 11 may be conveniently implemented where a given hydrocarbon reservoir has multiple producing horizons.

Figure 12:
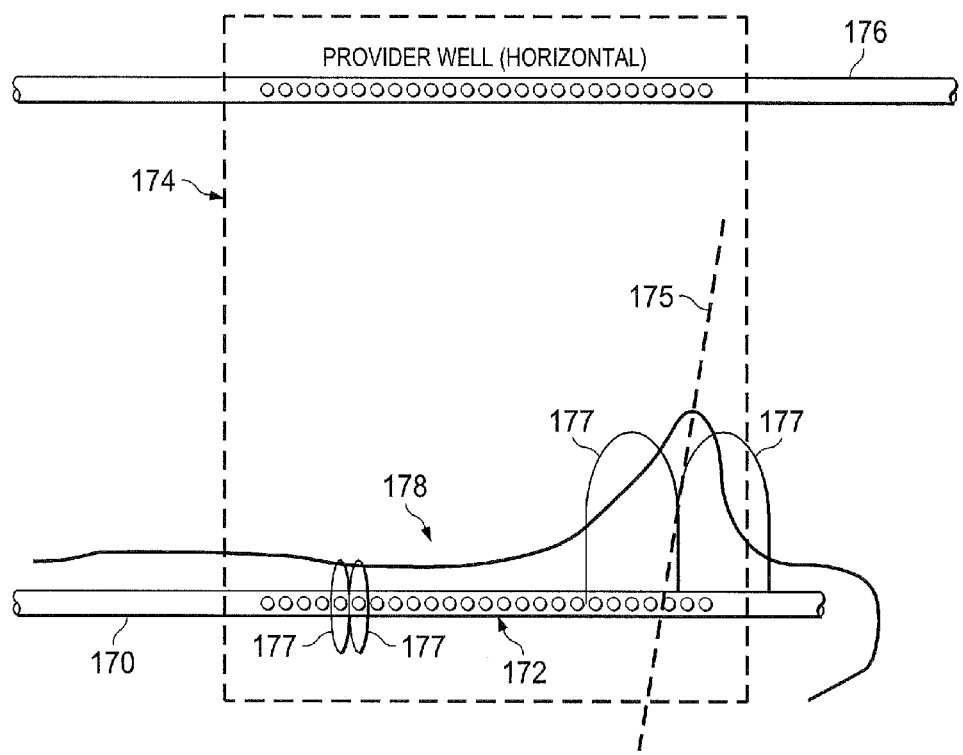
FIG. 12 is a schematic diagram of another borehole to borehole electromagnetic survey according to the present invention.

A further configuration, shown in FIG. 12, may be employed where only one borehole as indicated by a horizontal injector well 170 is available for data to be gathered. The well 170 contains one or more transmitters 172 and is located in a hydrocarbon reservoir 174 shown in plain view in FIG. 12. A long duration pulse is emitted from transmitters in the well 170 and is used to magnetize the injected fluids and/or the modified reservoir volume, and magnetic transients are observed along the borehole 170 containing the transmitter(s) 172. High permeability anomalies (super-K or fracture corridors 175) may be thereby detected from the single borehole 170 by estimating the total magnetic energy stored at each station along the borehole as indicated at 177 for several stations. A fluid front based on such estimates is schematically shown at 178. Regions with more injection fluid or greater modified reservoir volume display larger stored energies, and therefore higher remnant field strength and longer decay times. If a second distal borehole is available as shown at 176, RX stations may also be deployed and cross-well EM data gathered, similar to the configurations described above for FIGS. 8, 10 and 11.

Figure 13:
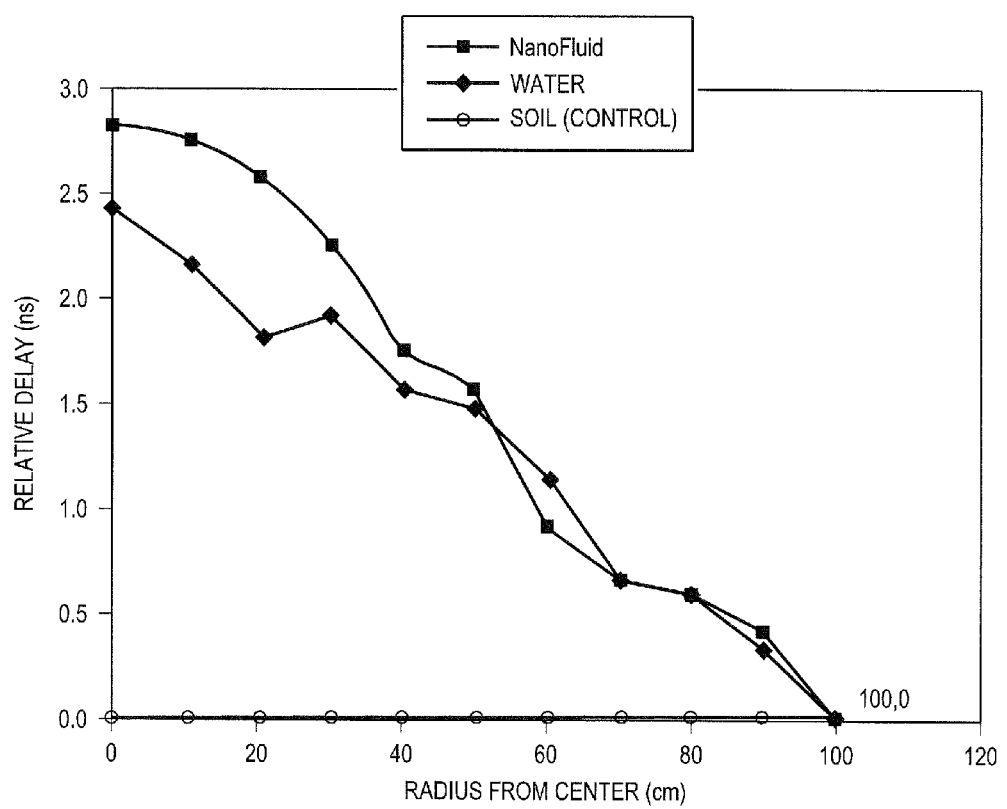
FIG. 13 is a schematic diagram of test results from a borehole to borehole electromagnetic survey according to the present invention.

A simplified small-scale version of the present invention was tested in the field using a pulsed EM source and loop antennas for the source and receiver. The apparatus was configured so as to mimic a borehole-to-surface configuration similar to that of FIG. 11, and a successful demonstration of travel time shifting of freely propagating TEM waves using a small ~0.5 meter phantom comprised of water loaded with magnetic nanoparticles. The EM source comprised ~50 feet of 50-ohm coax charged to ~1000 volts, a 1 mm air spark-gap, and a 3-turn loop antenna 10 cm in diameter in parallel with a 200 pf capacitor. This generated a 50 ns square wave pulse with a rise time of ~2 ns, superimposed with a 200 MHz sine wave. The receiver comprised a simple 3-turn loop antenna, and the waveforms were recorded with a 4 GHz digitizing oscilloscope. The signal delay (travel time) was mapped across the ground surface, while the EM signal from the buried source traversed unmodified sedimentary material, a water-filled phantom and a magnetic nanofluid filled phantom. Using unmodified sediment as a baseline ('before' signal), travel time delays consistent with the dielectric and magnetic properties of water and magnetic nanofluid were readily observed. The results are set forth in FIG. 13.

From the foregoing embodiments it can be seen that the present invention directly visualizes the path of injected fluids in the reservoir environment, while generating higher resolution images of the rock and fluid characteristics and distribution in the reservoir.

The present invention thus generates information about the spatial distribution and composition of fluids in a hydrocarbon reservoir. Since rock and hydrocarbons generally both have low dielectric constants, low magnetic permeability and low electrical conductivity, EM propagation rates are relatively high and cross-well or borehole-to-surface EM travel-times are relatively short. Thus, water, with high dielectric constant, often coupled with high conductivity if salty, generates high contrast in a travel-time map. Injected water, used to displace hydrocarbons, can be imaged with the present invention, and after a period of injection, the paths of high permeability and invasion by such injected water can be mapped. In a situation where water has been injected for a long period of time, it is difficult to differentiate original (connate) water from injected water. By 'labeling' new injection water with magnetic particles, as described, in such a way that the new injection water imparts magnetic permeability to the invaded region, it is possible to differentiate new from old water. This occurs since magnetic permeability decreases EM propagation rate and thereby imparts travel-time contrast in the EM velocity images of the reservoir region.

The invention has been sufficiently described so that a person with average knowledge in the matter may reproduce and obtain the results mentioned in the invention herein Nonetheless, any skilled person in the field of technique, subject of the invention herein, may carry out modifications not described in the request herein, to apply these modifications to a determined structure, or in the manufacturing process of the same, requires the claimed matter in the following claims; such structures shall be covered within the scope of the invention.

It should be noted and understood that there can be improvements and modifications made of the present invention described in detail above without departing from the spirit or scope of the invention as set forth in the accompanying claims.

What is claimed is:

1. A method of electromagnetic imaging of formation of a subsurface hydrocarbon reservoir structure containing fluids, comprising the steps of:
    introducing an injection fluid into the reservoir structure containing particles to change the electromagnetic character of the reservoir where fluids are present;
    emitting pulses of electromagnetic energy signals to travel through the reservoir;
    recording waveforms of the emitted electromagnetic energy signals received at a plurality of electromagnetic sensors;
    forming a measure of the travel time of the signals received at the plurality of electromagnetic sensors;
    decomposing the received signals into their frequency components;
    extracting travel time data of the received signals as a function of frequency; and
    forming, based on the extracted travel time data as a function of frequency, an inverted velocity image of subsurface features of the subsurface hydrocarbon reservoir.

2. The method of claim 1, wherein the step of forming a measure of the arrival time comprises forming measures of the changed arrival time of the emitted pulses due to the changed electromagnetic character of the reservoir where fluids are present.

3. The method of claim 1, wherein the step of introducing an injection fluid comprises:
    introducing a contrast fluid into the reservoir structure containing particles to change the magnetic character of the reservoir where fluids are present.

4. The method of claim 3, wherein the contrast fluid includes ferrites.

5. The method of claim 3, wherein the contrast fluid includes ferroelectrics.

6. The method of claim 3, wherein the contrast fluid includes conjugated conductive polymers.

7. The method of claim 1, wherein the step of introducing an injection fluid comprises:
    introducing a contrast fluid into the reservoir structure containing particles to change the dielectric character of the reservoir where fluids are present.

8. The method of claim 7, wherein the contrast fluid includes a suspension of conductive particles.

9. The method of claim 1, wherein the subsurface hydrocarbon reservoir structure comprises a reservoir matrix having formation rock with pore throats in the formation rock, and wherein the injection fluid comprises a contrast fluid containing a suspension of particles with a diameter of up to about 20% of the diameter of the majority of pore throats in the reservoir matrix.

10. The method of claim 1, wherein the step of emitting pulses of electromagnetic energy further includes the step of emitting pulses of electromagnetic energy from a plurality of electromagnetic energy sources to travel through the subsurface hydrocarbon reservoir.

11. The method of claim 10, further including the step of lowering the plurality of electromagnetic energy sources in a well tool through a well bore in the subsurface reservoir.

12. The method of claim 11, further including the step of moving the well tool to a succession of locations in the well bore for emitting pulses of electromagnetic energy at the locations for travel through the subsurface hydrocarbon reservoir.

13. The method of claim 10, further including the step of locating the plurality of electromagnetic energy sources in an array over an earth surface above the subsurface reservoir.

14. The method of claim 1, further including the step of lowering the plurality of electromagnetic sensors in a well tool through a well bore in the subsurface reservoir.

15. The method of claim 14, further including the step of moving the well tool to a succession of locations in the well bore for forming at the locations a measure of the travel time of the emitted pulses from the electromagnetic energy source.

16. The method of claim 1, further including the step of locating the plurality of electromagnetic sensors in an array over an earth surface above the subsurface reservoir.

17. The method of claim 1, further including the step of performing a tomographic inversion analysis of the electromagnetic energy sensed by the plurality of electromagnetic sensors.

* * * * *